May 3, 1966 G. E. ROWE 3,249,209
CONVEYOR DRIVE MECHANISM FOR GLASSWARE FORMING MACHINES
Filed Dec. 30, 1963 3 Sheets-Sheet 1
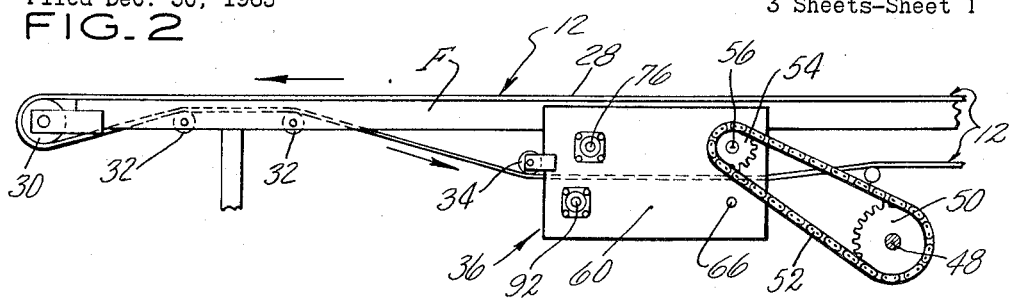
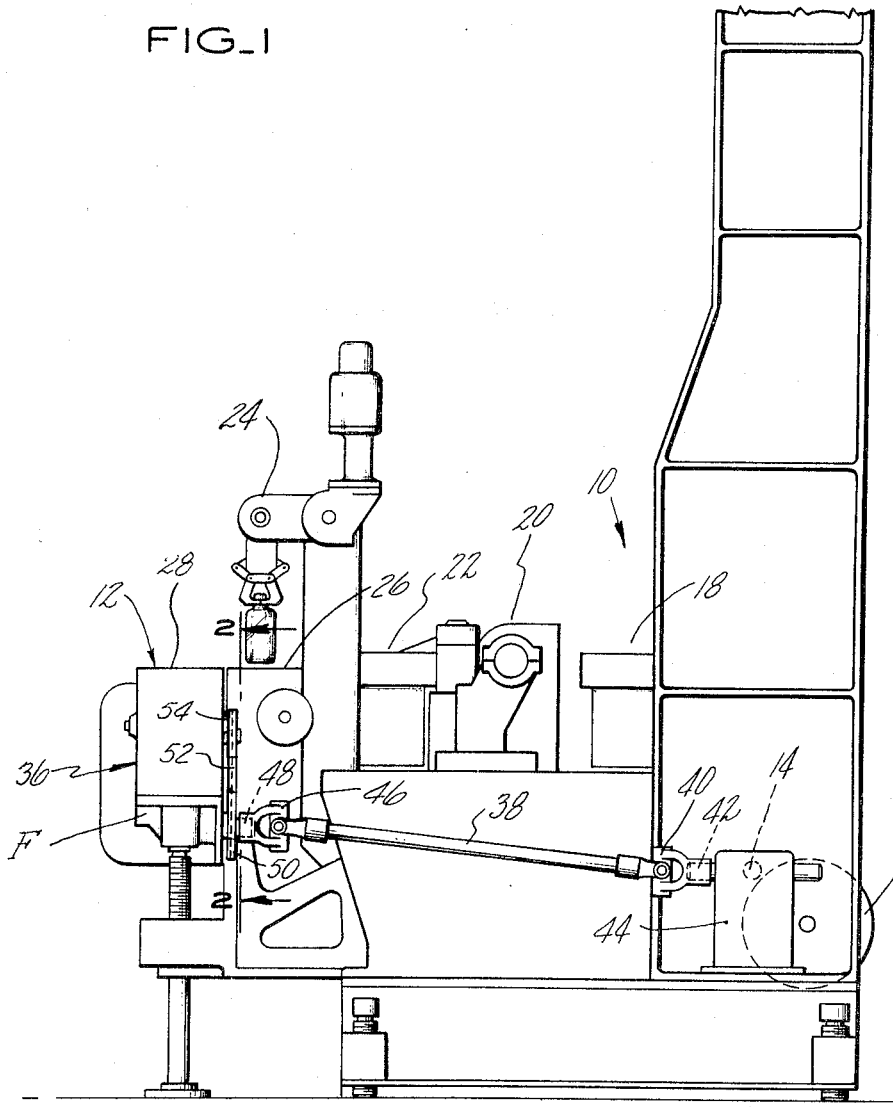
INVENTOR
GEORGE E. ROWE
BY McCormick, Paulding & Huber
ATTORNEYS May 3, 1966  G. E. ROWE  3,249,209

CONVEYOR DRIVE MECHANISM FOR GLASSWARE FORMING MACHINES

Filed Dec. 30, 1963  3 Sheets-Sheet 2

INVENTOR
GEORGE E. ROWE

BY McCormick, Paulding & Huber
ATTORNEYS

May 3, 1966  G. E. ROWE  3,249,209
CONVEYOR DRIVE MECHANISM FOR GLASSWARE FORMING MACHINES
Filed Dec. 30, 1963  3 Sheets-Sheet 3

INVENTOR
GEORGE E. ROWE
BY McCormick, Paulding & Huber
ATTORNEYS

United States Patent Office 3,249,209
Patented May 3, 1966

3,249,209
CONVEYOR DRIVE MECHANISM FOR GLASS-WARE FORMING MACHINES
George E. Rowe, Wethersfield, Conn., assignor to Emhart Corporation, a corporation of Connecticut
Filed Dec. 30, 1963, Ser. No. 334,342
2 Claims. (Cl. 198—203)

This invention relates to mechanism for driving a generally horizontal endless conveyor belt, which is entrained over idler pulleys, in timed relationship with operation of a multiple section glassware forming machine.

In the modern high production glassware making plant, it is a conventional practice to utilize a bank of glassware forming machines and to provide a common drive for them so that the bank of machines can be considered as a composite machine with each individual machine comprising a section thereof. The machines or sections comprising the bank are arranged in a row with each section producing its formed glassware in timed relationship with the production of the other sections. This is commonly done today with the well-known Hartford I.S. machine such as shown in United States Patent No. 1,911,119, and it is believed that this same practice will be employed in the use of glassware forming machines of the type shown in my copending United States application, Serial No. 110,461, filed May 16, 1961, but it is understood that the present invention is not limited to application with any specific type or style of glassware forming machine.

It is desirable to provide a single conveyor for removing the still-hot formed glassware from the front of the side-by-side machines or sections. This conveyor may transport the glassware to a lehr where it will be subjected to heat, but in any event it is subjected to heat due to its association with the machine sections and in the handling of the hot newly formed glassware, and this heat is one cause for the trouble encountered in maintaining a critical relationship between the speed of operation of the conveyor and the operating or producing speed of the forming machine sections. The presently most desirable conveyor comprises a wire mesh endless belt that is entrained over end pulleys. The conventional way of driving the conveyor is to drive one of its end pulleys, and it is absolutely essential that the upper extent of the endless conveyor belt be driven at a constant critical speed. This is to provide for known equal spacing of the glassware placed thereon as the conveyor belt passes the multiple sections of the composite glassware forming machine.

In fixing the conveyor belt speed at a constant level, it is necessary to have a constant dimension from the center of the driving pulley to the midpoint in the thickness of the belt. Obviously, a change in belt temperature tends to change the belt thickness and thus to alter the aforedescribed pitch line dimension. It is also obvious that with routine wear the thickness of the belt will change as will its length, and slippage may occur between the drive pulley and the belt necessitating tightening and thus further stretching of the belt. After repeated tightening and stretching, the thickness of the belt is further changed to effect a change in the speed of the conveyor, and this will upset the critical spacing of the glassware on the conveyor. Even if the speed of the conveyor is changed very slightly so as to effect a change of only a few thousandths of an inch in the spacing between glassware placed on the conveyor by adjacent machine sections, the spacing differential becomes progressively more pronounced as the conveyor passes several machine sections and before the last glassware article is placed thereon.

In accordance with the present invention, the conveyor belt is entrained over idler pulleys and the lower extent of the belt is engaged on both sides and pulled. That is, a portion of the lower extent of the conveyor belt is interposed between upper and lower endless link belt chains having traction means that are biased into engagement with the belt and these chains are driven by the drive mechanism of the glassware forming machine so that the belt is moved in timed relationship with operation of the forming machine. This drive mechanism, which may be referred to hereinafter as a "tractor drive" will maintain constant conveyor speed without any dependency upon thickness or length of the belt, and the belt speed cannot be altered as a result of temperature change or other outside influence.

Therefore, it will be understood that it is the general object of the invention to provide a drive mechanism for an endless belt conveyor that is associated with a glassware forming machine or machines, and which will advance the conveyor at a constant critical speed related to the operation of the glassware forming machines so that glassware placed on the conveyor by the machines will be properly spaced in the high speed production of such glassware.

The drawings show a preferred embodiment of the invention and such embodiment will be described, but it will be understood that various changes may be made from the construction disclosed, and that the drawings and description are not to be construed as defining or limiting the scope of the invention, the claims forming a part of this specification being relied upon for that purpose.

Of the drawings:

FIG. 1 is an end elevational view of a rather diagrammatically illustrated glassware forming machine and the conveyor associated therewith and provided in accordance with the present invention;

FIG. 2 is a fragmentary rear elevational view of the conveyor and its drive mechanism, this view being taken generally as indicated by the line 2—2 of FIG. 1;

Figure 3:
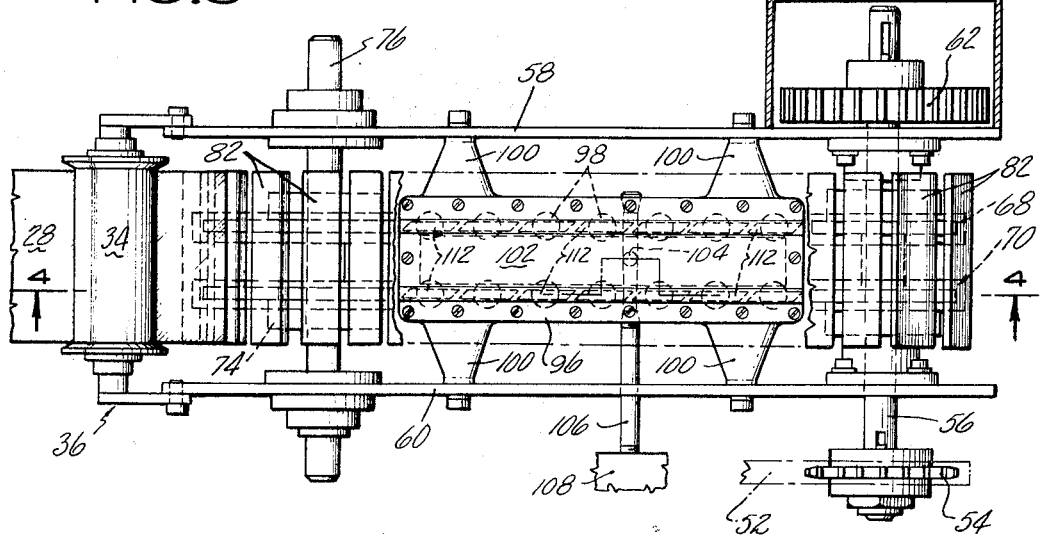
FIG. 3 is an enlarged top plan view of the conveyor drive mechanism provided by the present invention.

In FIG. 1 the schematically illustrated glassware forming machine is indicated generally by the reference numeral 10, and the glassware moving conveyor associated with said machine is indicated generally by the reference numeral 12. The glassware forming machine 10 that is illustrated is the Hartford I. S. machine and it will be understood that in an installation for which the present invention is contemplated there will be a plurality of such machines or sections arranged in side-by-side relationship. In such side-by-side relationship of the machines, they will all be driven off a common drive shaft 14. At each machine or section suitable drive linkages are provided to rotate a timing drum 16 upon which a plurality of valve actuators are located to operate valves which control the operations of the forming machine elements.

Such forming machine elements include a parison mold apparatus 18 wherein a gob of molten glass is initially formed into a parison. The forming machine elements also include a transfer mechanism 20 for moving the partially formed glassware article or parison from the parison mold apparatus 18 to a blow mold apparatus 22 wherein the parison is formed into the final shape of the glassware article. It will be understood that a "double gob" process can be used rather than a "single gob" in which event there will be two articles of glassware formed simultaneously, first as parisons and then as final articles. The glassware machine also includes a takeout mechanism 24 which removes the finally shaped articles of glassware from the blow mold apparatus 22 and places the glassware on a deadplate 26 adjacent to and at the side of the conveyor 12. Then, mechanism which is not shown but which is a part of the glassware forming machine and which is operated in timed relationship by the control drum 16 moves the article or articles of glassware from the deadplate 26 onto the upper extent of the conveyor belt 28.

As shown in FIG. 2, the upper extent of the conveyor belt 28 is disposed horizontally and is supported for horizontal movement over a frame F, the said belt being entrained over idler end pulleys such as the pulley 30 of FIG. 2. The lower extent of the conveyor belt 28 is below the frame F and moves over a pair of rollers 32, 32 and under a guide roller 34 into the tractor drive unit 36 which forms a substantial part of the drive mechanism of this invention.

This tractor unit 36 is connected to the drive of the forming machine 10 by motion transmitting means including a shaft 38 having a universal coupling 40 at one end thereof which is also connected with a shaft 42 extending from a speed control unit 44 whose input is provided by the forming machine drive shaft 14. At the front end of the shaft, which is adjacent the tractor unit 36, another universal coupling 46 connects the said shaft with a stub shaft 48 suitably journaled on the frame F to rotate a drive sprocket 50 (FIG. 2). A chain 52 on the said drive sprocket is entrained over a driven sprocket 54 keyed to a shaft 56 journaled in the tractor unit 36 to provide the driven shaft therefor.

Figure 4:
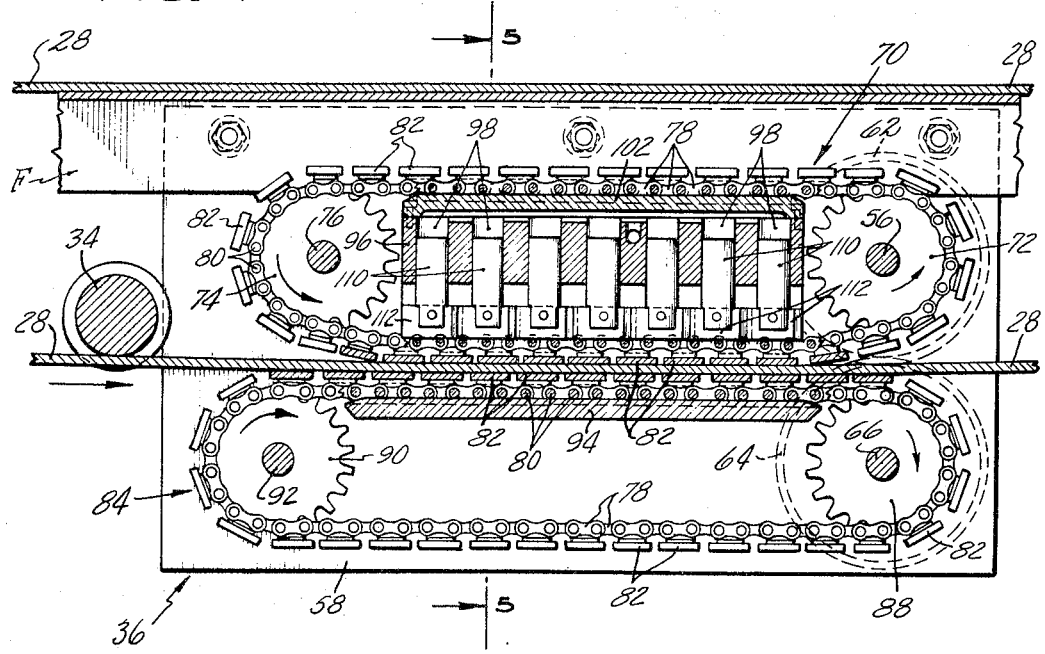
FIG. 4 is a longitudinal cross sectional view taken through the aforesaid drive mechanism and viewed as indicated generally by the line 4—4 of FIG. 3.
Figures 5, 6:
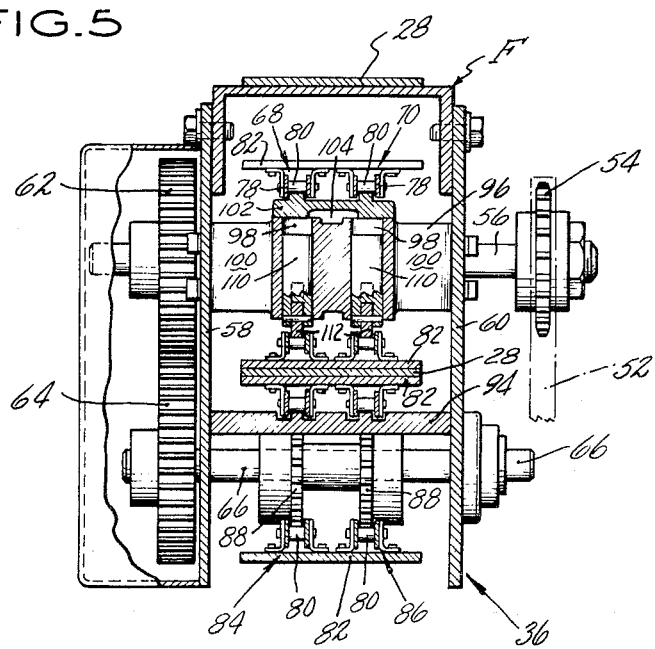
FIG. 5 is a transverse sectional view through the drive mechanism taken as indicated by the line 5—5 of FIG. 4.
FIG. 6 is a perspective view illustrating one of the pistons that are biased to effect the conveyor belt engagement of the previously mentioned roller link driving chains.

As best shown in FIGS. 3-5, the tractor drive unit 36 comprises a front plate 58 and a rear plate 60 which are secured to the conveyor belt supporting frame F to depend therefrom in longitudinal parallel relationship with the belt 28. The driven shaft 56 is rotatably supported in the said front and rear plates 58 and 60 and extends transversely of the belt 28 below its upper extent and above its lower extent. A gear 62 is keyed to the front end portion of the driven shaft 56 in front of the front plate 58 and it meshes with a gear 64 that is keyed to a shaft 66 that is similarly supported to the shaft 56 parallel thereto but below the lower extent of the belt 28. Thus, both shafts 56 and 66 are driven, and they provide the driven sprockets shaft for upper and lower pairs of endless roller link chains that feature the drive mechanism of this invention.

There are two identical roller link chains in the upper pair comprising a front chain 68 and a rear chain 70, each of which is entrained over a drive sprocket 72 keyed to the shaft 56 and each of which is also entrained over an idler sprocket 74 mounted on a shaft 76 that is supported by the front and rear plates 58 and 60. As best seen in FIGS. 4 and 5, each of the chains 68 and 70 comprises a plurality of links 78, 78 that are connected at their ends by rollers 80, 80. And, in keeping with the present invention, the upper pair of chains 68 and 70 are provided with a common traction means for engaging the lower extent of the conveyor belt 28. This traction means preferably comprises a plurality of plates 82, 82 there being one such plate extending transversely of the two chains and connected to companion links thereof. As will be seen in FIG. 4, the traction plates 82, 82 on the upper pair of chains 68, 70 are arranged to engage the upper surface of the lower extent of the conveyor belt 28 as the said chains are driven in the direction indicated by the arrows on the sprockets 72 and 74. In further accord with the present invention, fluid pressure exerting means is provided to bear downwardly on the lower extent of the upper pair of chains to force said traction plates into engagement with the conveyor belt 28, and the aforesaid fluid pressure exerting means will be described in greater detail hereinafter.

The lower pair of endless chains, comprising a front chain 84 and a rear chain 86 are constructed similarly to the upper pair. That is, each of the lower chains includes the links 78, 78 and the rollers 80, 80 and they are provided with common traction means or plates 82, 82. The lower chains 84 and 86 are entrained over driven sprockets 88, 88 keyed to the driven shaft 66, and they are also entrained over idler sprockets 90, 90 mounted on a common shaft 92, that is supported by the front and rear plates 58 and 60.

The arrangement of the lower pair of chains 84 and 86 is different from that of the upper pair in that the traction means on the lower pair of chains is not biased into engagement with the lower extent of the conveyor belt 28. Instead, the upper extent of the lower pair of chains is supported in a horizontal position by movement over a horizontal plate 94 so as to support a portion of the lower extent of the conveyor belt adjacent and below the upper pair of chains.

The means for biasing the upper pair of chains into engagement with the conveyor belt includes a cylinder block 96 defining a plurality of cylinders 98, 98 arranged in spaced apart relationship in rows over the lower extent of each of the upper chains 68 and 70. The said block has forwardly and rearwardly extending portions 100, 100 extending to the front and rear plates 58 and 60 for mounting the block, and the block is closed by a removable cover 102. Cooperating grooves in the underside of the cover 102 and in the upper surface of the block 96 define a manifold 104 interconnecting the tops of several cylinders 98, 98 for the introduction of air or other pressurized fluid thereto. A pipe 106 connects this manifold with a valve controlled source of fluid under pressure 108. Fluid under pressure in the cylinders 98, 98 acts upon pistons 110 which are slidable in said cylinder passages. Thus, the said pistons are biased downwardly, and a shoe 112 is secured to the lower end portion of each piston to bear against the rollers 80, 80 of the links of the chains 68, 70 passing therebelow.

Obviously, the fluid pressure exerted force of the shoes 112, 112 on the said chain links biases the traction plates 82, 82 of the upper pair of chains against the lower extent of the conveyor belt 28 which is supported on the other side by the traction plates 82, 82 of the lower pair of chains. It is also obvious that the upper pair of chains being driven at the same speed as the lower pair of chains but in the opposite rotative directions, the extents of said chains engaging the lower extent of the conveyor belt 28 move in the same direction and move the conveyor belt with it at the same speed. This speed of the conveyor belt will not be altered at all by changes in its temperature or in any of its dimensions. Therefore, the speed of the conveyor belt relative to the speed of operation of the glassware making machine 10 remains constant and is operated in timed relationship therewith. The constant speed of the conveyor belt 28 can be critically selected by adjustment of the speed control unit 44, and "on-off" operation the conveyor drive mechanism is controlled by respectively admitting air under pressure to the manifold 104 or by venting the manifold by conventional valve means in the conduit 106.

The invention claimed is:

1. A mechanism for driving a generally horizontal endless conveyor belt over idler pulleys in timed relationship with the operation of at least one section of a glassware forming machine which includes a power operated drive and apparatus driven thereby to form glassware and place it on the upper extent of the conveyor belt, said mechanism comprising a pair of equal parallel endless roller link chains supported above the lower extent of the belt for movement parallel thereto in transversely spaced apart relationship to each other, a second pair of endless roller link chains supported below the first pair and below the lower extent of the belt for movement parallel thereto, each pair of said chains being provided with traction means for engaging said belt and the upper extent of the lower pair of chains being supported to support a portion of the lower extent of the belt on its traction means, the said traction means associated with each pair of chains comprising a plate secured to a link in each chain of the pair and extending transversely for substantially the width of the conveyor belt, there being one such plate associated with each link in each chain of the pair that is spaced from the similar adjacent plates, motion transmitting means interconnecting the machine drive and said respective pairs of chains to drive each pair simultaneously with the other pair but in opposite rotative directions, and fluid pressure exerting means bearing downwardly on the lower extent of the upper pair of chains to forceably engage the said belt portion between the respective pairs of chains and thus to drive the conveyor belt at a linear speed timed to operation of the machine.

2. A conveyor belt driving mechanism as set forth in claim 1 wherein the fluid pressure exerting means comprises a bank of air cylinders spaced longitudinally of each chain in the upper pair, each such air cylinder having a piston therein which is provided with a shoe at its bottom end engaging the rollers of the links of the associated chain to bias the links and their associated traction plates downwardly.

References Cited by the Examiner

UNITED STATES PATENTS

| | | | |
|---|---|---|---|
| 2,236,751 | 4/1941 | Dine | 226—172 |
| 2,759,596 | 8/1956 | Keller | 198—203 |
| 2,915,171 | 12/1959 | Peck | 226—172 |
| 3,024,956 | 3/1962 | Gretter | 226—172 |

SAMUEL F. COLEMAN, *Primary Examiner.*

RICHARD E. AEGERTER, *Examiner.*